United States Patent [19]

Hulet

[11] Patent Number: 5,033,621

[45] Date of Patent: Jul. 23, 1991

[54] BRAKE ROTOR STACKING DEVICE

[75] Inventor: Robert T. Hulet, Phoenix, Ariz.

[73] Assignee: D&M Supply, Inc., Tempe, Ariz.

[21] Appl. No.: 532,880

[22] Filed: Jun. 4, 1990

[51] Int. Cl.⁵ .......................................... B65D 21/02
[52] U.S. Cl. ................................... 206/501; 206/821;
211/194
[58] Field of Search ............... 206/501, 821, 319, 335,
206/503; 211/49.1, 194

[56] References Cited

U.S. PATENT DOCUMENTS

| | | | |
|---|---|---|---|
| 1,908,940 | 5/1933 | Weidel . | |
| 3,685,646 | 8/1972 | Sy | 206/821 |
| 3,885,072 | 5/1975 | Westenrieder | 306/821 |
| 4,069,914 | 1/1978 | Damsky | 206/821 |
| 4,098,400 | 7/1978 | Brown | 200/821 |
| 4,225,626 | 9/1980 | Chiu et al. | 200/821 |
| 4,234,097 | 11/1980 | Daenen | 206/501 |
| 4,316,281 | 2/1982 | Prusak . | |
| 4,498,595 | 2/1985 | Wilson | 211/194 |

Primary Examiner—Joseph Man-Fu Moy
Attorney, Agent, or Firm—LaValle D. Ptak

[57] ABSTRACT

A brake rotor and brake drum stacking device, which is particularly useful for use in salvage yards and the like, comprises a unitary plastic member having a circular outer rim connected by means spaced-apart spokes with a holllow central hub. The hub is in the form of a stepped inverted cup, so that disc brake rotors have the disc surface supported by the spokes, with the studs and crown extending into hollow central hub. A sandwich arrangement of alternating stacking devices and disc brake rotors may be made, with the studs of the disc brake rotors supporting the next higher stacking device, with the crown of the rotor extending into the interior of the central hub. The dimensions of the stacking device permit a single sized stacking device to be used to stack disc brake rotors made by different manufacturers and used with vehicles of different sizes.

14 Claims, 2 Drawing Sheets

BRAKE ROTOR STACKING DEVICE

BACKGROUND

In the automobile salvage business, it is necessary to provide shelves or bins for storing a variety of different component parts from a large number of different makes and models of automobiles and trucks. Often parts are stored on outdoor shelves, and are identified by part tags wired to them to permit ready identification and access to the parts as they are requested by customers. Many of these parts can be stored outdoors without any problems. If disc brake rotors, however, are placed on outdoor shelves, moisture collects between the flat disc surface and the shelf, significantly increasing the potential for rust and deterioration of the disc surface. In addition, the rotor profiles are such that they do not lend themselves to simple storage by stacking them together on shelves.

The disc portion of the rotors typically is mounted on a central raised portion which has an offset indentation in the bottom of it. The upper side of this raised portion typically holds studs which are used to attach the wheel of the vehicle to the rotor assembly In the center of the circle on which the studs are mounted is a raised crown in which the wheel bearings are located. If salvaged rotors have the bearings exposed to the elements in an outdoor storage area, it is possible for rust buildup to occur in the bearings and substantially reduce the value of the disc brake rotor/bearing combination.

Another problem with the storage of disc brake rotors in a salvage yard is that they do not lend themselves to convenient stacking because of the offset shape of the crown and the stud mounting area. The problem with stacking rotors is particularly true if rotors of different sizes, which have the studs on them located different distances apart, are stored and stacked in a common location. The problem is further compounded since disc brake rotors are relatively heavy, typically weighing between 20 and 40 pounds each.

Stacking devices for facilitating the stacked storage of disc brake rotors are not known. Stacking devices for facilitating the storage of reels of magnetic tape, however, have been developed. Two patents which disclose such devices are the patents to No. 3,685,646 and Damsky No. 4,069,914. Both of these patents are directed to stacking trays for reels of magnetic tape.

In the device of Sy, the tray has a circular configuration, with a raised central portion and raised edges. The center of a tape reel fits over the raised central portion and the tape itself rests on the bottom of the tray in engagement with the tray bottom. Upper trays rest on top of the tape in the reel of the next lower tray in the stack, and each of the trays includes projections near the hub for extending into recesses in the tape reel. This configuration prevents the relative rotation of the trays and reels with respect to one another.

The trays of Sy are made to specifically fit tape reels which are of the same size. Thus, there is no provision required to accommodate reels of different sizes. In addition, there is no provision whatsoever to permit water to drain from the trays. This is understandable, since they are not intended for outdoor use. The trays of Sy contact both sides of the tape reels which are stored.

The patent to Damsky also is used for stacking reels of magnetic tape. No tray-like structure, however, is employed in Damsky. Instead, a flat disk, with alternating pins and holes located around a circular opening, is used. The pins extend upwardly through corresponding openings in the hub of a tape reel which is to be stored on the disk. These pins extend sufficiently high through the hub to engage holes in the next flat storage disk of the stack. When a stack of alternating disks and tape reels is made, an interlocked pancake stack results. The disks contact the tape on both sides. There is no provision for, nor any necessity for, facilitating water drainage from the disks.

It is desirable to provide a stacking device, particularly suited for vertically stacking disc brake rotors and brake drums, which is capable of intermixing rotors of different sizes, is simple in construction, and which provides protection of the stacked rotors from the elements, even when the rotors are stored in outdoor locations.

SUMMARY OF THE INVENTION

It is an object of this invention to provide an improved stacking device.

It is another object of this invention to provide an improved brake rotor stacking device;

it is an additional object of this invention to provide an improved brake rotor and brake drum stacking device capable of stacking a mixture of rotors and brake drums of different sizes.

It is a further object of this invention to provide a brake rotor and brake drum stacking device particularly suited for stacking such rotors and drums in outdoor locations in salvage yards, while simultaneously protecting the crown and stud area from the elements, and permitting water to drain away from the disc surfaces.

In accordance with a preferred embodiment of the invention, a brake rotor and brake drum stacking device is made in the form of a circular outer rim, having a raised edge, with a diameter sufficient to accommodate the maximum diameter of typical brake rotors. This outer rim is interconnected with a hollow central hub in the form of a stepped, inverted cup by means of spaced spokes or ribs. The spaces between the spokes permit water to pass through the stacking device. The dimensions of the stepped, inverted cup are selected to cause a first central portion to fit over the crown of disc brake rotors and a second, lower portion to rest on the tops of the studs of the rotor placed beneath the stacking device. The disc surfaces of the rotors rest on the spokes of successive devices in the stack, which is formed by alternating stacking devices and rotors.

DETAILED DESCRIPTION

Reference now should be made to the drawings in which the same reference numbers are used throughout the different figures to designate the same components.

Figure 1:
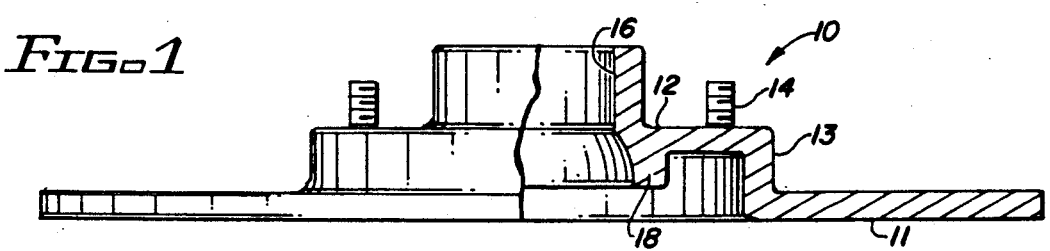
FIG. 1 is a partially cut away side view of a typical disc brake rotor used in conjunction with a preferred embodiment of the invention.
Figure 2:
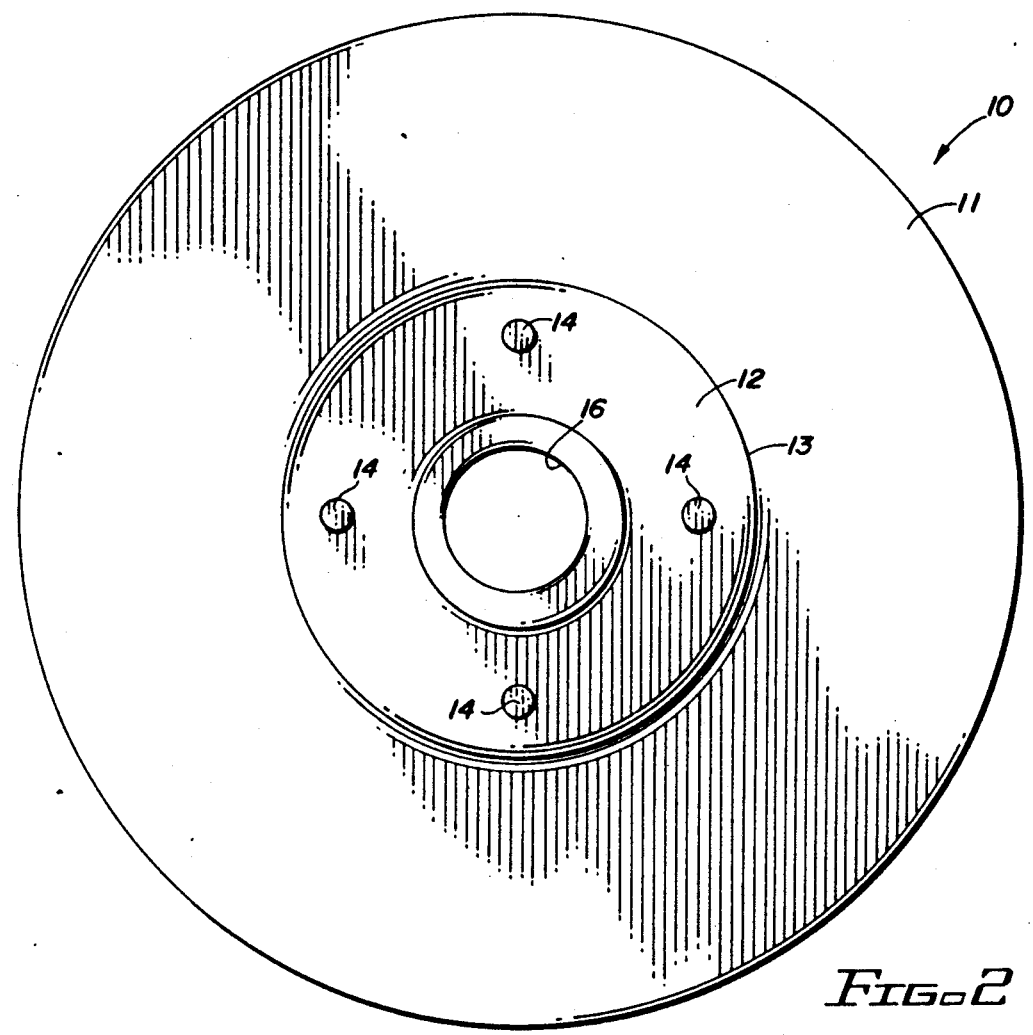
FIG. 2 is a top view of the disc brake rotor shown in FIG. 1.

In order more clearly to understand the preferred embodiment of the invention, and the manner in which it is used, reference first should be made to FIGS. 1 and 2 which illustrate a typical disc brake rotor of the type used on nearly all makes and models of cars and light trucks currently sold today, with the exception of four wheel drive vehicles. Such rotors typically include a relatively large, circular disc 11 which is engaged by the brake pads of the vehicle in which the rotor is installed. This disc 11 is mounted on a central raised portion 13 which has an upper surface 12, where the studs 14 used to attach the wheel hub to the rotor assembly are located. In the center of the circle on which the studs 14 are mounted, is a raised crown 16. The wheel bearings are mounted inside the crown 16 to permit the rotor to rotate about the axle of the vehicle. As is apparent from an examination of the cut-away portion of FIG. 1, the raised portion 13 is hollow, with a lower edge or surface 18 located above the plane of the lower side of the disc 11. While some variations in the configurations of disc brake rotors from the structure shown in FIG. 1 take place, the differences between rotors for different vehicles are relatively minor. The structures shown in FIG. 1 and 2 are typical.

Figure 3:
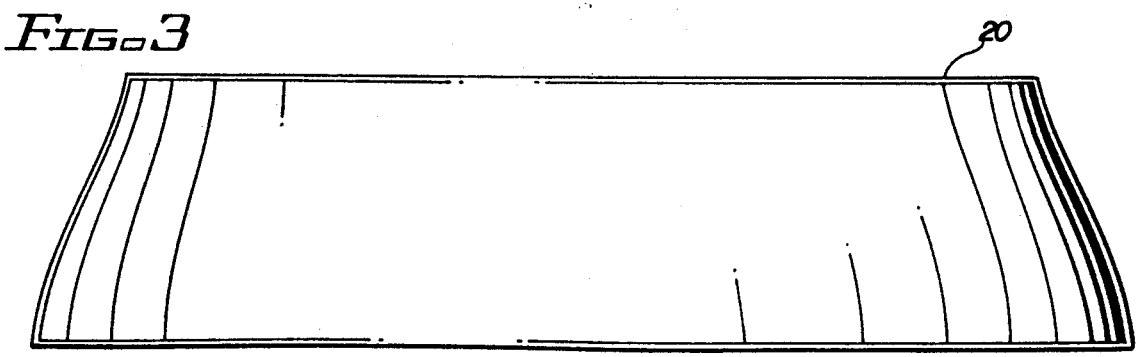
FIG. 3 is a side view of a typical brake drum of a type which may be used in conjunction with the preferred embodiment of the invention.

FIG. 3 is a side view showing the relative shape and dimensions of a brake drum assembly of the type still used on at least the rear wheels of many vehicles manufactured today. Such drum assemblies are circular in configuration, with an overall profile of the type as shown for the drum 20 in FIG. 3. The disc brake rotors of FIGS. 1 and 2 and the drums of FIG. 3, all are manufactured with dimensions which vary over a relatively narrow range.

Figure 4:
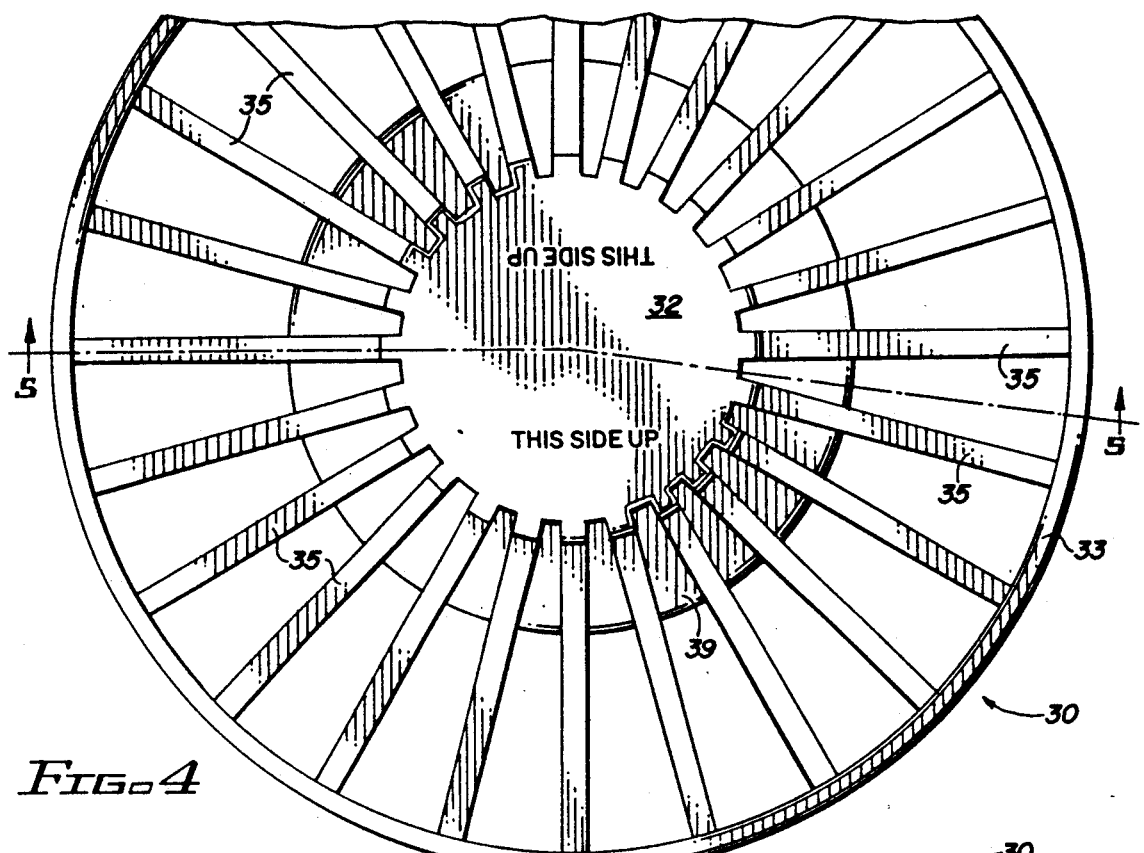
FIG. 4 is a top view of a preferred embodiment of the invention.
Figure 5:
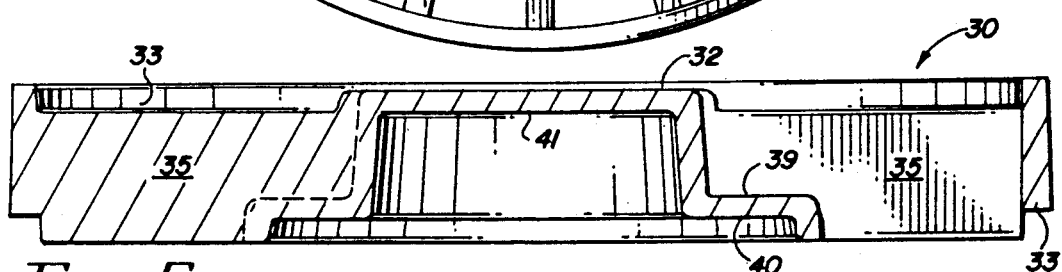
FIG. 5 is cross-sectional side view of the device of FIG. 4, taken along the line 5—5 of FIG. 4.
Figure 6:
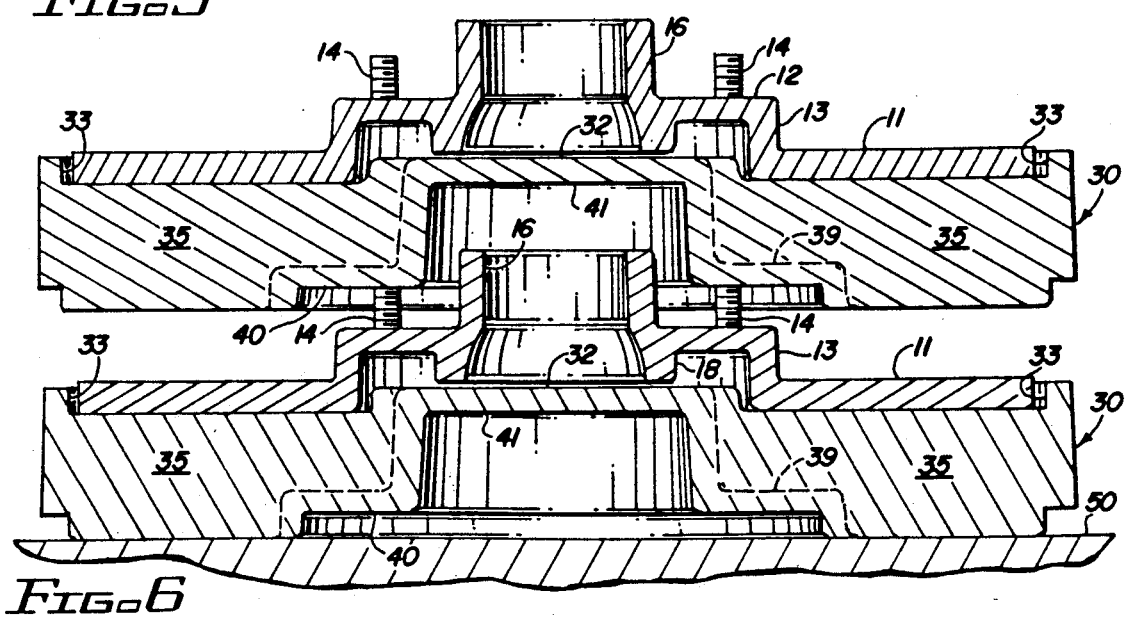
FIG. 6 is cross-sectional view of a stack of devices of the type shown in FIG. 5, with rotors of the type shown in FIG. 1.

To facilitate the stacking and storage of disc brake rotors of the type shown in FIGS. 1 and 2, the preferred embodiment of the invention shown in FIGS. 4, 5 and 6 has been developed. The desirability of stacking and storing disc brake rotors which have been removed from wrecked and junked cars of various makes and models arises in conjunction with salvage yards, although the preferred embodiment of the invention also could be used for facilitating the shipment and storage of new brake rotors.

As is readily apparent from an examination of the profile of the disc brake rotor of FIG. 1, such disc brake rotors 10 do not lend themselves to simple storage by stacking them together on shelves. To permit level and secure stacking of such rotors, the unitary plastic molded rotor stacking device shown in FIGS. 4 and 5 has been developed. FIG. 4 is a top view, and FIG. 5 is a partially cut-away side view of a preferred embodiment of the invention. The stacking device comprises a raised central circular hub 32 which is attached to a circular outer rim 33 by means of several spaced-apart ribs or spokes 35.

As is apparent from an examination of FIGS. 4 and 5, the ribs 35 are relatively narrow (as viewed from the top) with a vertical height which is approximately equal to the vertical height of the outer rim 33. The ribs 35, however, are depressed from the plane of the upper surface of the rim 33 on the upper side, and extend below the plane of the lower edge of the rim 33 by an equal amount, as shown most clearly in FIG. 5. As also illustrated in FIG. 5, the top of the central hub 32 is located in a plane slightly below the plane of the upper edge of the rim 33. This arrangement permits nesting of a stack of storage devices when they are being shipped and stored.

In addition, it should be noted that there is a stepped lower or bottom portion 39 which extends outwardly from the central hub 32 approximately ⅓ of the distance between the hub 32 and the rim 33; so that the combination of the top portion of the hub 32 with the outer bottom portion 39 forms a hollow inverted, stepped, cup-like central structure. When the stacking device is oriented as shown in FIGS. 4 and 5, any rain or moisture which falls onto the device from the top, passes through the spaces which exist between the ribs 35. Since the inverted central hub with the hollow interiors 40 and 41 in the portions 39 and 32, respectively, is made of solid material, no moisture coming from above can enter the interiors 40 and 41.

Reference now should be made to FIG. 6 which shows the manner in which the stacking device of FIGS. 4 and 5 is used to accommodate a stack of disc brake rotors 10 of the type shown in FIG. 1. The stack is begun by placing one of the devices of FIGS. 4 and 5 on the ground or on a storage shelf 50. This device then comprises the base for the stack. A rotor 10 then is placed on top of this device. The lower side of the disc 11 rests on the top edges of the ribs 35. The distance between the rim 33 and the point at which the recessed ribs 35 attach to the central upright portion of the hub 32 is greater than the corresponding maximum and minimum dimensions of the disc portion 11 of this brake rotor assembly. Thus, the disc 11 nests on top of the ribs 35 in the manner shown in FIG. 6.

The diameter of the circle where the ribs 35 are attached to and step down from the top portion of the hub 32, is selected to be slightly less than the minimum corresponding inside diameter of the disc portion 11 of the conventional disc brake rotors to permit the secure nesting arrangement shown in FIG. 6. Currently manufactured brake rotors have a minimum gap in this dimension of five inches, and the diameter of the corresponding step at the point where the ribs 35 connect to the hub 32 is chosen to be 4.95 inches in the preferred embodiment. In addition, the maximum diameter of the crowns of currently manufactured disc brake rotors is 3.69 inches. This is less than the internal diameter of the hollowed out portion 41, located beneath the top surface of the central portion of the hub 32. This inner diameter in the preferred embodiment shown is 3.75 inches.

To permit the next stacking device 30 in the stack to be securely and horizontally supported, the hollowed out portion 40 beneath the outwardly extending bottom portion 39 of the central hub of the stacking device is selected to have an internal diameter which is greater than the maximum diameter between studs 14 located on opposite sides of the crown 16 of the disc brake rotor 10. Currently, the maximum stud diameter of disc brake rotors is 7.07 inches, and the internal diameter of the hollowed out portion 40 is 7.21 inches. The minimum diameter between the studs 14 of presently available disc brake rotors is 4.69 inches. Since the internal diameter of the hollowed out portion 41 is 3.75 inches, this minimum stud diameter is greater than that measurement. Consequently, the studs 14 always rest on the upper inner surface of the portion 40 of the stepped bottom portion 39 of the central hub of the stacking device. The next higher stacking device is placed on top of the lowermost disc brake rotor 10 as shown in FIG. 6.

It is readily apparent that the cup-shaped inverted central hub portion fully covers the crown 16, which is located inside the hollow interior 41, beneath the central top portion of the hub 32. Similar protection also is provided for the studs 14 which are located within the hollow portion 40, beneath the bottom portion 39 of the central hub. This provides weather protection for these parts of the disc brake assembly, and inhibits rain and moisture from entering this region to corrode or otherwise damage the parts which are located there. The maximum distance between the top of the crown 16 and the studs 14, which is present in currently available disc rotors, is selected to be less than the distance between the top of the portion 41 and the top of the portion 40 which rests on the ends of the studs 14. The maximum stud to crown distance for currently manufactured disc brake rotors is 1.22 inches, and the distance between the top of the hollow portion 41 and the top of the hollow portion 40 is selected to be 1.28 inches, to provide the suitable clearance necessary.

The final dimension which must be considered to permit proper stacking of successive stacking devices and disc brake rotors is the stud length of the studs 14. Currently, the minimum stud length of available disc brake rotors is 0.88 inches, and the distance between the surface of the hollowed out portion 40, which rests on top of the studs, and the plane of the lower edges of the ribs 35, is selected to be 0.35 inches. This insures that the lower edges of the ribs 35 are spaced above the top surface of the disc 11 of the disc brake rotor assembly.

In order to accommodate the stacking of brake drums, such as the drum 20 of FIG. 3, either alone or intermixed with disc brake rotors, it should be noted that the current maximum brake drum diameter of most automobiles and light trucks today is 14.13 inches. This is less than the internal diameter of the rim 33 (14.28 inches). By making the internal diameter of the outer rim 33 this wide, the stacking devices 30 can be used to stack either drums or disc brake rotors, or a mix of the two.

As is readily apparent from an examination of FIG. 6, the stack which is shown can be repeated to any practical height. Any water or other fluids which pass into the region on which the discs 11 rest, passes downwardly through the open spaces between the ribs 35 to drain away from the discs 11. As mentioned previously, the inverted cup-shaped, stepped inner hub of the stacking device 30 provides protection for the crown 16 of the disc brake rotor, as well as for the studs 14 to shield these areas from the weather when the devices are stacked outdoors, as is typically done in salvage yards and wrecking yards.

Ideally, the entire stacking assembly is made as an integral one piece molded unit of suitable structural plastic material. The particular material which is used is dependent upon the strength and life characteristics desired.

The preferred embodiment of the invention which is shown and which has been described above, is to be considered illustrative of the invention and not as limiting. For example, a greater number, or lesser number of ribs 35 could be used in the structure. The thickness of the outer rim 33 and the ribs 35 also may be varied without departing from the scope of the invention. The relative dimensions which have been selected are chosen to permit a universal use of the stacking device, but in those areas where such dimensions are not critical, they may be varied without departing from the scope of the invention. In place of the ribs 35 which have been shown to interconnect the central hub with the rim 33, a perforated or mesh-like construction may be substituted, so long as the functional characteristics remain. Various other changes and modifications will occur to those skilled in the art without departing from the true scope of the invention as set forth in the appended claims.

I claim:

1. A brake rotor and brake drum stacking device, including in combination:
   a circular outer rim having a first predetermined diameter with an upper edge and a lower edge;
   a central hub in the form of a stepped, inverted, circular cup having an inner top portion, with a second predetermined diameter less than said first determined diameter, and an outer bottom portion, located a first predetermined distance below said top portion, with the diameter of said bottom portion being less than said first predetermined diameter and greater than said second predetermined diameter;
   connecting means interconnecting said central hub with said outer rim, said connecting means having openings therein to permit fluids to pass therethrough; and
   said top and bottom portions of said central hub being hollow, with first and second predetermined inside diameters respectively.

2. The combination according to claim 1 wherein said connecting means comprises a plurality of spaced-apart spokes.

3. The combination according to claim 2 wherein said spokes have an upper surface located in a plane below the plane of the upper edge of said circular outer rim, and have a lower surface located in a plane below the plane of the lower surface of said outer rim.

4. The combination according to claim 3 wherein said top and bottom portions of said central hub are fluid tight.

5. The combination according to claim 4 wherein said outer rim, said central hub, and said connecting means are all integrally formed as a single unitary structure.

6. The combination according to claim 5 wherein said device is an integral plastic casting.

7. The combination according to claim 6 wherein the inner diameter of said outer rim is greater than the outer diameter of a disc brake rotor, and the dimensions of said hollow top portion and said hollow bottom portion of said central hub are selected to accommodate the crown and studs, respectively, of disc brake rotors to permit a sandwich stacking of alternating ones of said stacking devices and disc brake rotors with the hollow interior of said central hub protecting the crowns and studs of disc brake rotors from the elements, and said openings in said connecting means permitting fluids to drain away from the disc surfaces of disc brake rotors.

8. The combination according to claim 1 wherein said outer rim, said central hub, and said connecting means are all integrally formed as a single unitary structure.

9. The combination according to claim 8 wherein said device is an integral plastic casting.

10. The combination according to claim 9 wherein the inner diameter of said outer rim is greater than the outer diameter of a disc brake rotor, and the dimensions of said hollow top portion and said hollow bottom portion of said central hub are selected to accommodate the crown and studs, respectively, of disc brake rotors to permit a sandwich stacking of alternating ones of said stacking devices and disc brake rotors with the hollow interior of said central hub protecting the crowns and studs of disc brake rotors from the elements, and said openings in said connecting means permitting fluids to drain away from the disc surfaces of disc brake rotors.

11. The combination according to claim 10 wherein said top and bottom portions of said central hub are fluid tight.

12. The combination according to claim 1 wherein said device is an integral plastic casting.

13. The combination according to claim 1 wherein said top and bottom portions of said central hub are fluid tight.

14. The combination according to claim 1 wherein the inner diameter of said outer rim is greater than the outer diameter of a disc brake rotor, and the dimensions of said hollow top portion and said hollow bottom portion of said central hub are selected to accommodate the crown and studs, respectively, of disc brake rotors to permit a sandwich stacking of alternating ones of said stacking devices and disc brake rotors with the hollow interior of said central hub protecting the crowns and studs of disc brake rotors from the elements, and said openings in said connecting means permitting fluids to drain away from the disc surfaces of disc brake rotors.

* * * * *